US012734868B2

(12) United States Patent
Chiu et al.

(10) Patent No.: US 12,734,868 B2
(45) Date of Patent: Sep. 15, 2026

(54) AUTOMOTIVE SUNROOF APPARATUS AND WINDOW PANEL ASSEMBLY THEREOF

(71) Applicants: FUZHOU MINGFANG AUTOMOBILE PARTS INDUSTRY CO., LTD., Fuzhou (CN); HSIN CHONG MACHINERY WORKS CO., LTD., Taoyuan City (TW)

(72) Inventors: Tzu-Heng Chiu, Taoyuan City (TW); Yi-Jen Lan, Taoyuan City (TW); Karim Dayoub, Taoyuan City (TW); Chris Pelino, Taoyuan City (TW)

(73) Assignees: FUZHOU MINGFANG AUTOMOBILE PARTS INDUSTRY CO., LTD., Fuzhou (CN); HSIN CHONG MACHINERY WORKS CO., LTD., Taoyuan City (TW)

( * ) Notice: Subject to any disclaimer, the term of this patent is extended or adjusted under 35 U.S.C. 154(b) by 520 days.

(21) Appl. No.: 18/204,130

(22) Filed: May 31, 2023

(65) Prior Publication Data

US 2024/0116343 A1 Apr. 11, 2024

Related U.S. Application Data

(60) Provisional application No. 63/415,065, filed on Oct. 11, 2022.

(51) Int. Cl.

| | |
|---|---|
| ***B60J 10/82*** | (2016.01) |
| ***B60J 7/043*** | (2006.01) |
| ***B60J 10/15*** | (2016.01) |
| ***B60J 10/24*** | (2016.01) |
| ***B60J 10/34*** | (2016.01) |

(Continued)

(52) U.S. Cl.

CPC ............... *B60J 10/24* (2016.02); *B60J 7/043* (2013.01); *B60J 10/15* (2016.02); *B60J 10/34* (2016.02); *B60J 10/70* (2016.02); *B60J 10/82* (2016.02); *B60J 10/90* (2016.02); *B60J 7/00* (2013.01)

(58) Field of Classification Search

CPC ..... B60J 10/82; B60J 7/00; B60J 7/043; B60J 10/90

See application file for complete search history.

(56) References Cited

U.S. PATENT DOCUMENTS 10,076,952 B2 * 9/2018 Hall ......................... B60J 10/90
10,427,505 B2 * 10/2019 Kirchner .................... B60J 7/00

(Continued)

*Primary Examiner* — Muhammad Ijaz
*Assistant Examiner* — Susan M. Heschel
(74) *Attorney, Agent, or Firm* — HDLS IPR SERVICES; Chun-Ming Shih

(57) ABSTRACT

A window panel assembly includes a glass panel, a window frame and a sealing strip. The window frame is installed on the glass panel, the window frame includes an abutment seat extended therefrom. The abutment seat includes a connecting portion and an elastic arm portion. The connecting portion is connected to the window frame and the elastic arm portion. The elastic arm portion includes an abutment surface. The abutment seat includes blocking surfaces at two sides of the abutment surface. A buffer space is formed between the elastic portion and the window frame. The sealing strip is arranged at the window frame, and the sealing strip abuts against the blocking surfaces. Accordingly, the sealing effect of the window panel assembly during closing is improved without gaps.

18 Claims, 11 Drawing Sheets

(51) Int. Cl.

| | |
|---|---|
| ***B60J 10/70*** | (2016.01) |
| ***B60J 10/90*** | (2016.01) |
| *B60J 7/00* | (2006.01) |

(56) References Cited

U.S. PATENT DOCUMENTS 11,479,100 B2 * 10/2022 van Boxtel .............. B60J 10/90
11,498,402 B2 * 11/2022 Takahashi ................ B60J 10/25

* cited by examiner

AUTOMOTIVE SUNROOF APPARATUS AND WINDOW PANEL ASSEMBLY THEREOF

CROSS-REFERENCE TO RELATED APPLICATION

This patent application claims the benefit of U.S. Provisional Patent Application No. 63/415,065, filed Oct. 11, 2022, which is incorporated by reference herein.

BACKGROUND OF THE DISCLOSURE

Technical Field

The present disclosure relates to the automotive field, and in particular to an automotive window panel assembly.

Description of Related Art

A related-art automotive window is typically installed with sealing strip between the car body and the glass frame, and the sealing strip generates elastic deformation due to abutment with the car body or glass frame in order to achieve the sealing effect, thereby preventing rainwater or moisture from entering the interior of the car.

However, since related-art sealing strip has a rectangular shape corresponding to the car window profile, its manufacturing and assembly are relatively difficult. Some manufacturers have changed the sealing strip into a plurality of strip segments of linear structure; nevertheless, the attachment areas among sealing strips tend to have gaps due to the compression of soft materials such that the sealing effect is affected. In addition, after a sealing strip is used for a long period of time, deterioration and aging may occur due to sunlight exposure and moisture erosion, causing the sealing strip to change color and generate unpleasant odor.

In view of the above, the inventor seeks to overcome the aforementioned drawbacks and aims to provide an effective solution through extensive researches along with utilization of academic principles and knowledge.

SUMMARY OF THE DISCLOSURE

A primary objective of the present disclosure is to improve the sealing effect of window panel assembly installed on a car body and to prevent any gaps among sealing strips.

To achieve the aforementioned objective, the present disclosure provides a window panel assembly having a glass panel, a window frame, and a sealing strip. The window frame is installed on a circumference of the glass panel, and the window frame includes an abutment seat extended outward from a portion of an outer perimeter thereof. The abutment seat includes a connecting portion and an elastic arm portion. The connecting portion is connected to the window frame and the elastic arm portion. The elastic arm portion includes an abutment surface, and the abutment seat includes a pair of blocking surfaces arranged at two sides of the abutment surface. A buffer space is defined between the elastic arm portion and the window frame. The sealing strip is arranged on the outer perimeter of the window frame, and one end of the sealing strip abuts against one of the blocking surfaces.

According to an embodiment of the present disclosure, the elastic arm portion is a semi-circle plate.

According to an embodiment of the present disclosure, the abutment surface is arranged on one side of the elastic arm portion opposite from the buffer space. When the abutment surface is compressed, the elastic arm portion is able to generate an elastic deformation to be partially received inside the buffer space.

According to an embodiment of the present disclosure, the window frame further includes another abutment seat extended therefrom, and two ends of the sealing strip abut against the blocking surfaces of the abutment seats respectively.

According to an embodiment of the present disclosure, the window panel assembly further includes another sealing strip, and one end of each one of the sealing strips abuts against each one of the blocking surfaces of the abutment seat respectively.

According to an embodiment of the present disclosure, the window frame and the abutment seat are integrally formed by plastic injection molding.

According to an embodiment of the present disclosure, the window frame and the abutment seat are integrally formed by injection molding with a polyurethane.

According to an embodiment of the present disclosure, a thickness of the abutment seat is tapered from the connecting portion toward the abutment surface.

According to an embodiment of the present disclosure, a cross-sectional area of the elastic arm portion is wider than an area of the abutment surface.

To achieve the aforementioned objective, the present disclosure further provides an automotive sunroof apparatus having a car body and a window panel assembly. The car body includes a window opening. The window panel assembly is arranged on the window opening and includes a glass panel, a window frame, and a sealing strip. The window frame is installed on a circumference of the glass panel, and the window frame includes an abutment seat extended outward from a portion of an outer perimeter thereof. The abutment seat includes a connecting portion and an elastic arm portion. The connecting portion is connected to the window frame and the elastic arm portion. The elastic arm portion includes an abutment surface, and the abutment seat includes a pair of blocking surfaces arranged at two sides of the abutment surface. A buffer space is defined between the elastic arm portion and the window frame. The sealing strip is arranged at the outer perimeter of the window frame, and one end of the sealing strip abuts against one of the blocking surfaces. Accordingly, when the window panel assembly closes the window opening, a lateral side of the sealing strip and the abutment surface press an inner edge of the window opening firmly.

The window panel assembly of the present disclosure utilizes the abutment seat extended outward from the window frame to allow the sealing strip to abut against the blocking surface of the abutment seat to achieve the sealing effect. Accordingly, it is able to effectively improve the problem of improper sealing due to the gaps formed by the sealing strips having similar material hardness.

DETAILED DESCRIPTION

The technical contents of this disclosure will become apparent with the detailed description of embodiments and the accompanied drawings as follows. However, it shall be noted that the accompanied drawings for illustrative purposes only such that they shall not be used to restrict the scope of the present disclosure.

Figure 1:
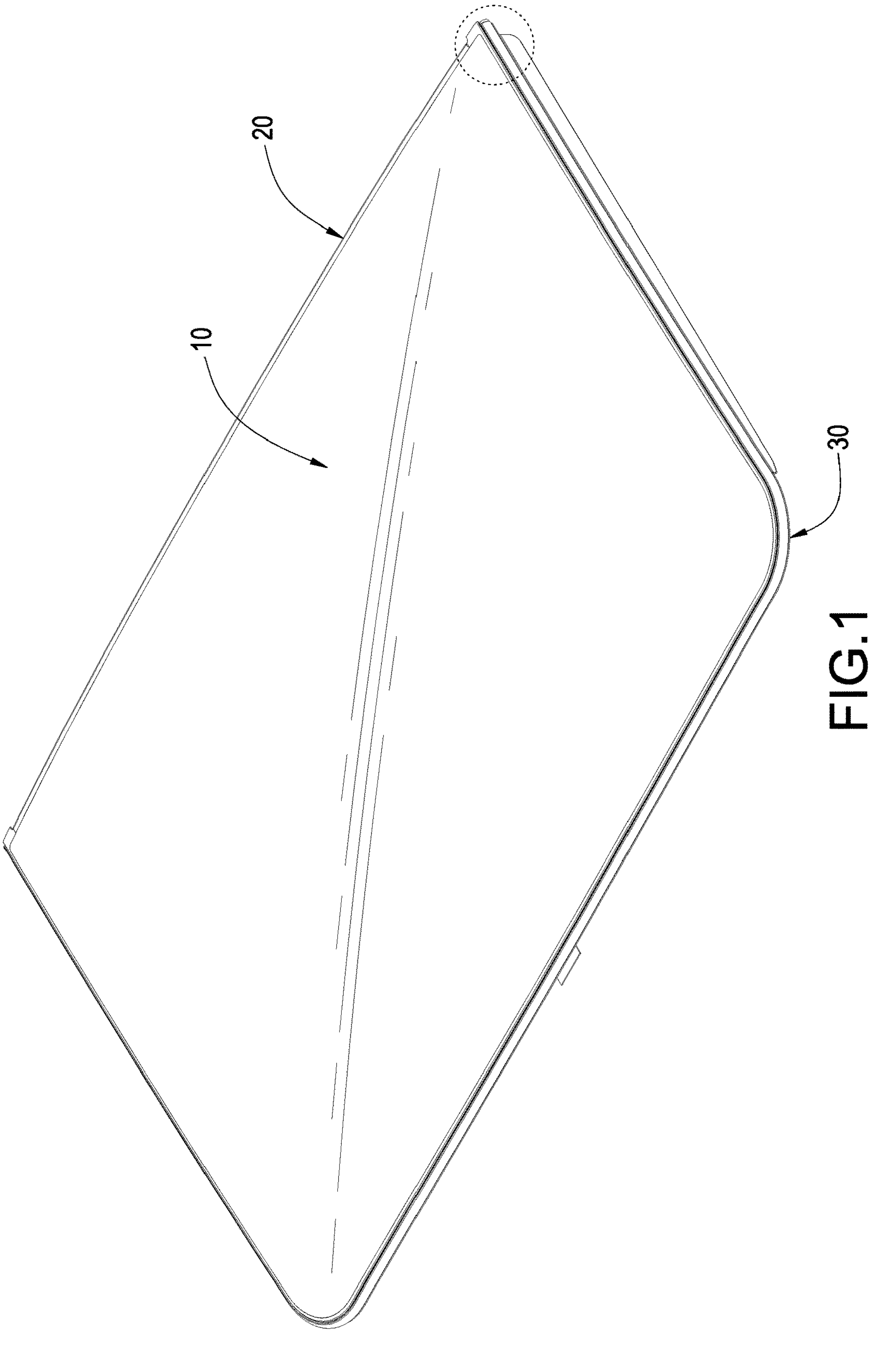
FIG. 1 is a perspective appearance view of the present disclosure.
Figure 2:
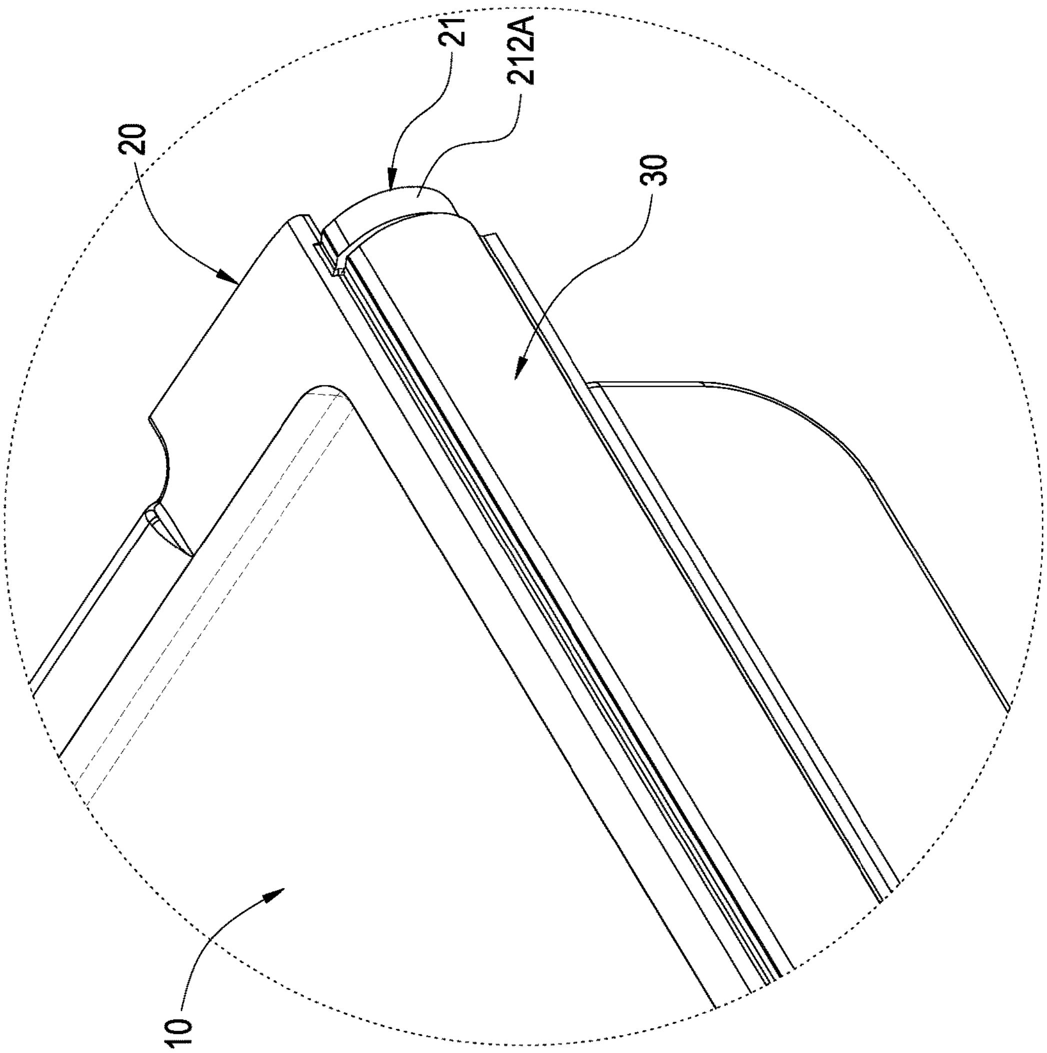
FIG. 2 is a partially enlarged view of FIG. 1.
Figure 3:
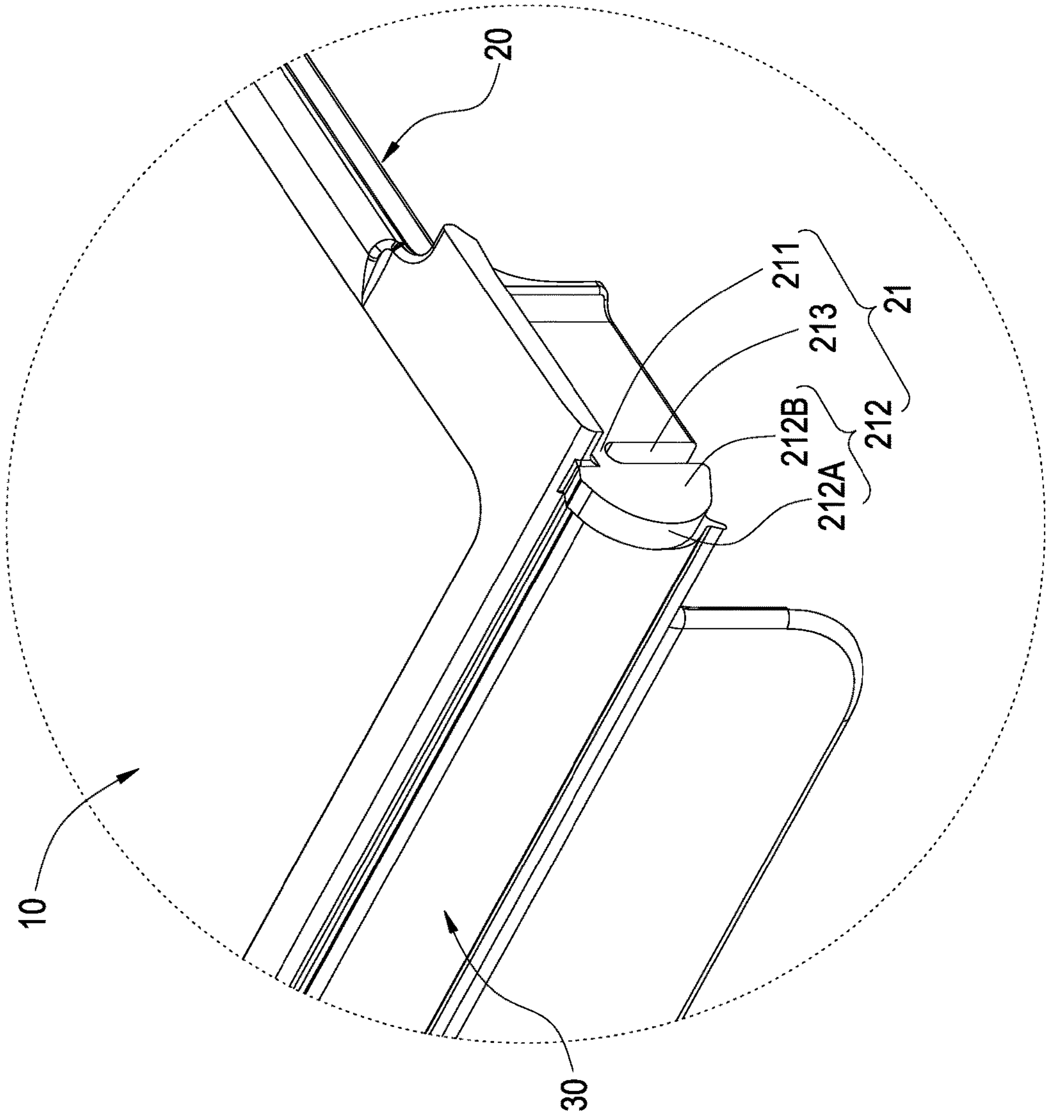
FIG. 3 is another partially enlarged view of FIG. 1 from another angle.
Figure 4:
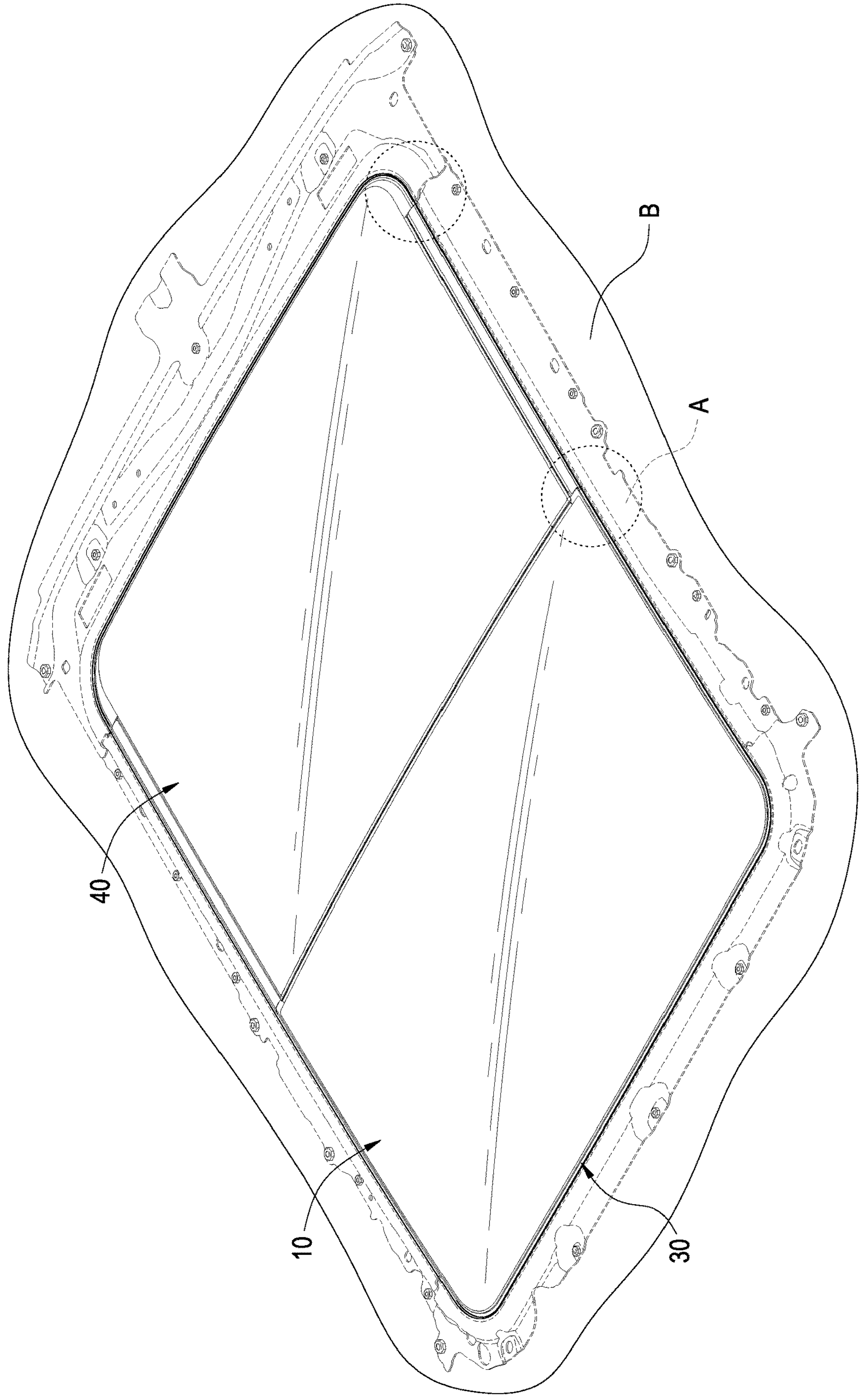
FIG. 4 is a perspective appearance view of the present disclosure under a state of use (I)
Figure 5:
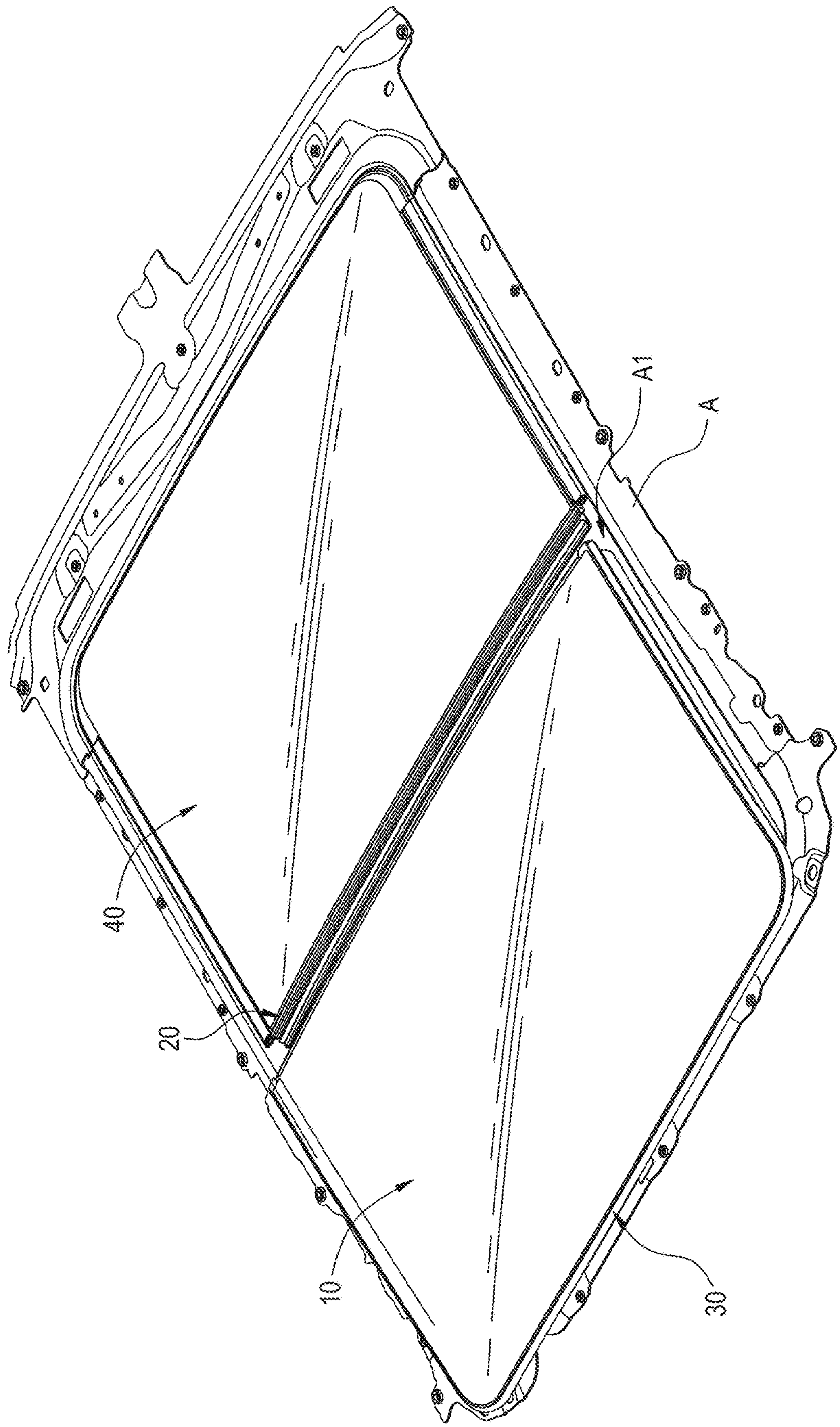
FIG. 5 is a perspective appearance view of the present disclosure under another state of use (II)
Figure 6:
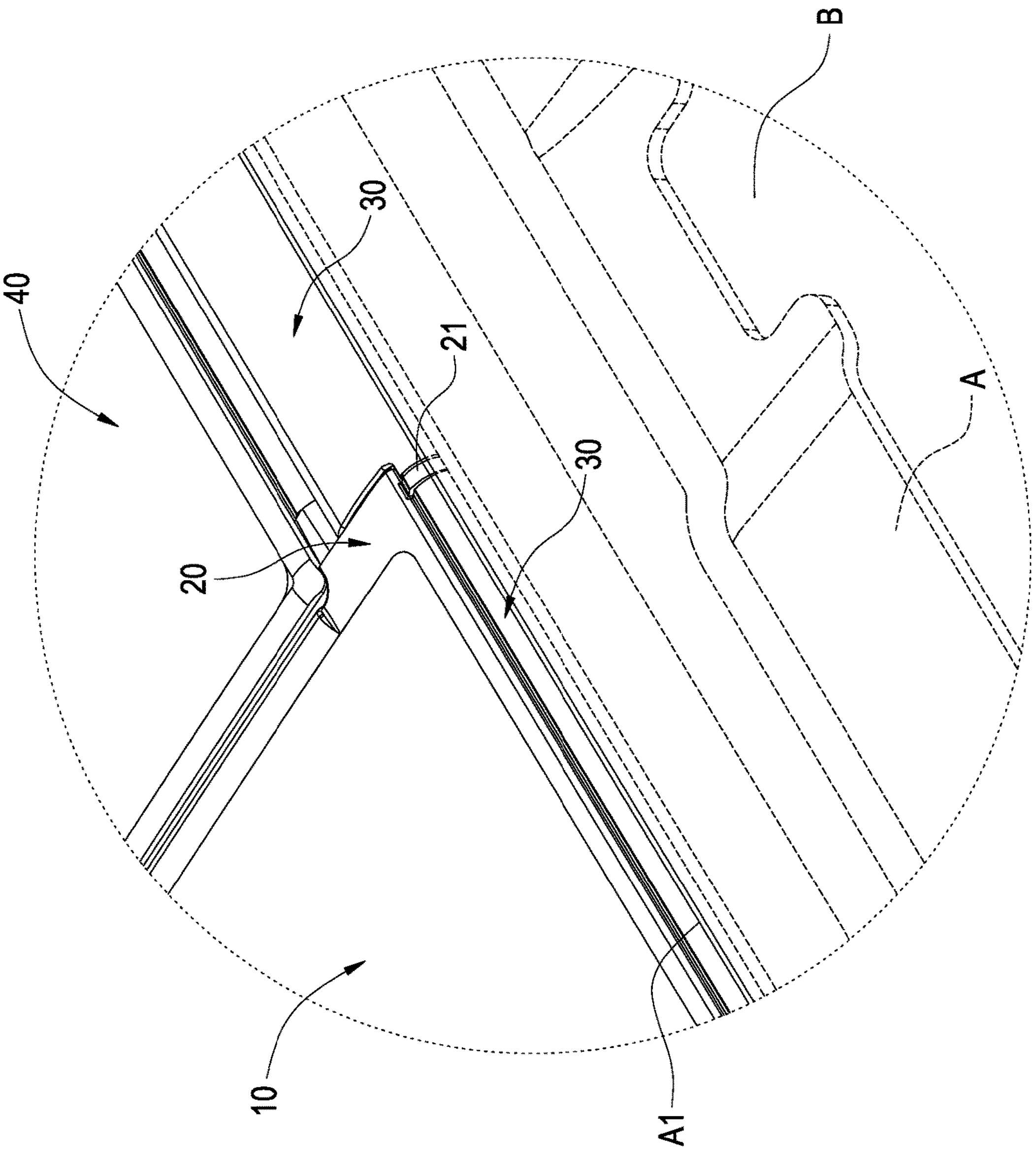
FIG. 6 is a partially enlarged view of FIG. 4.
Figure 7:
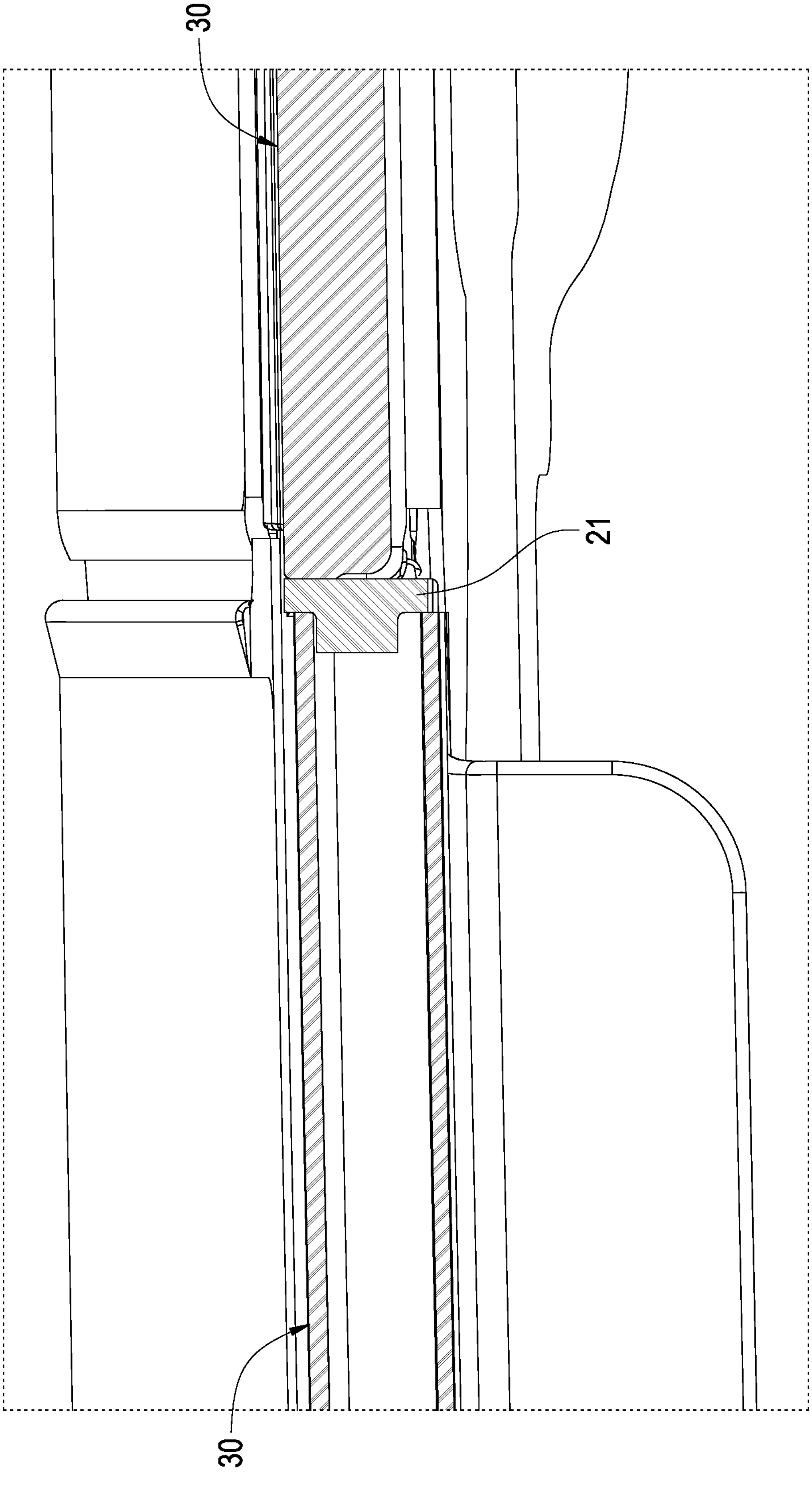
FIG. 7 is a partially cross-sectional view of FIG. 4.
Figure 8:
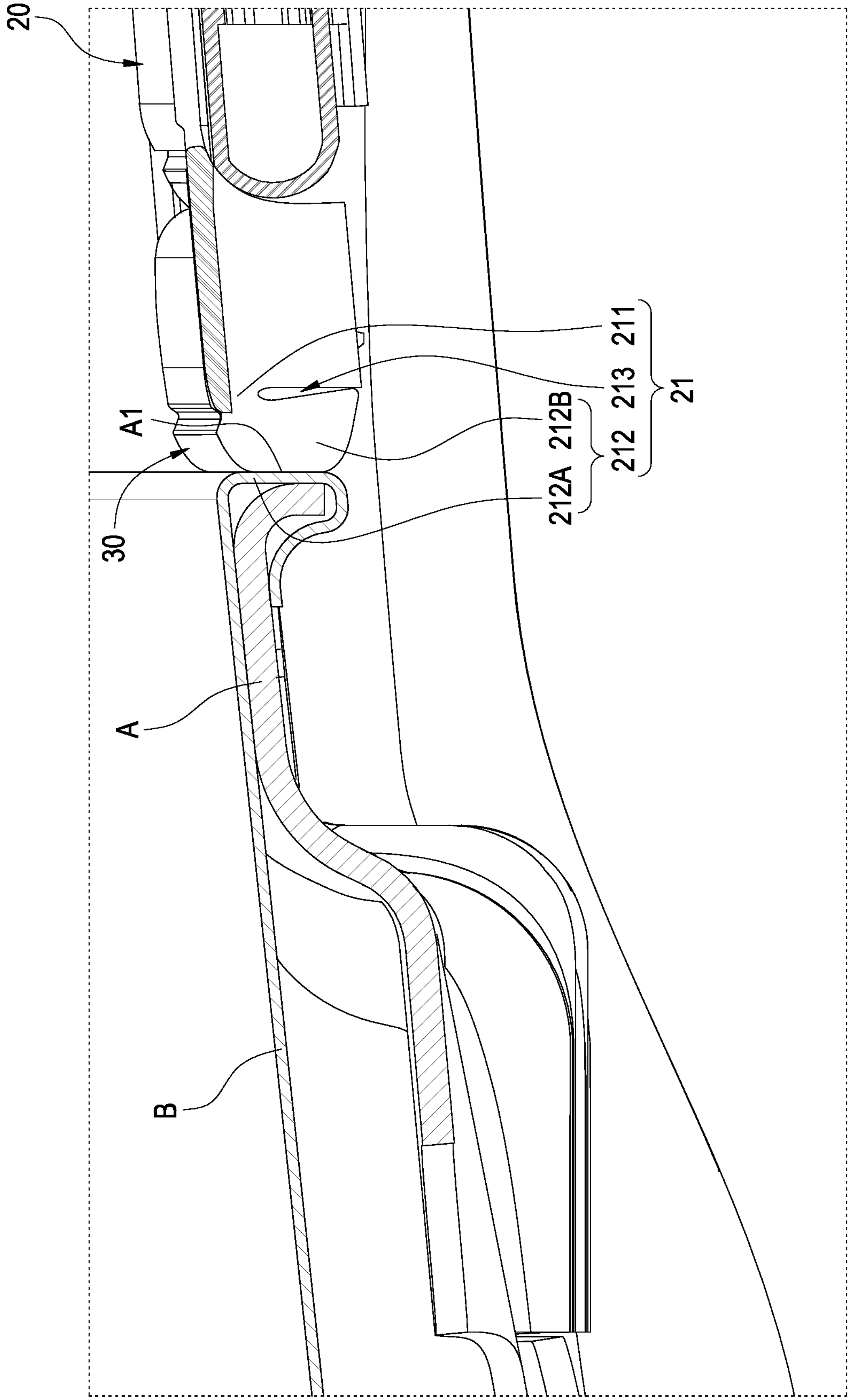
FIG. 8 is another partial enlarged view of FIG. 4 from another angle.
Figure 9:
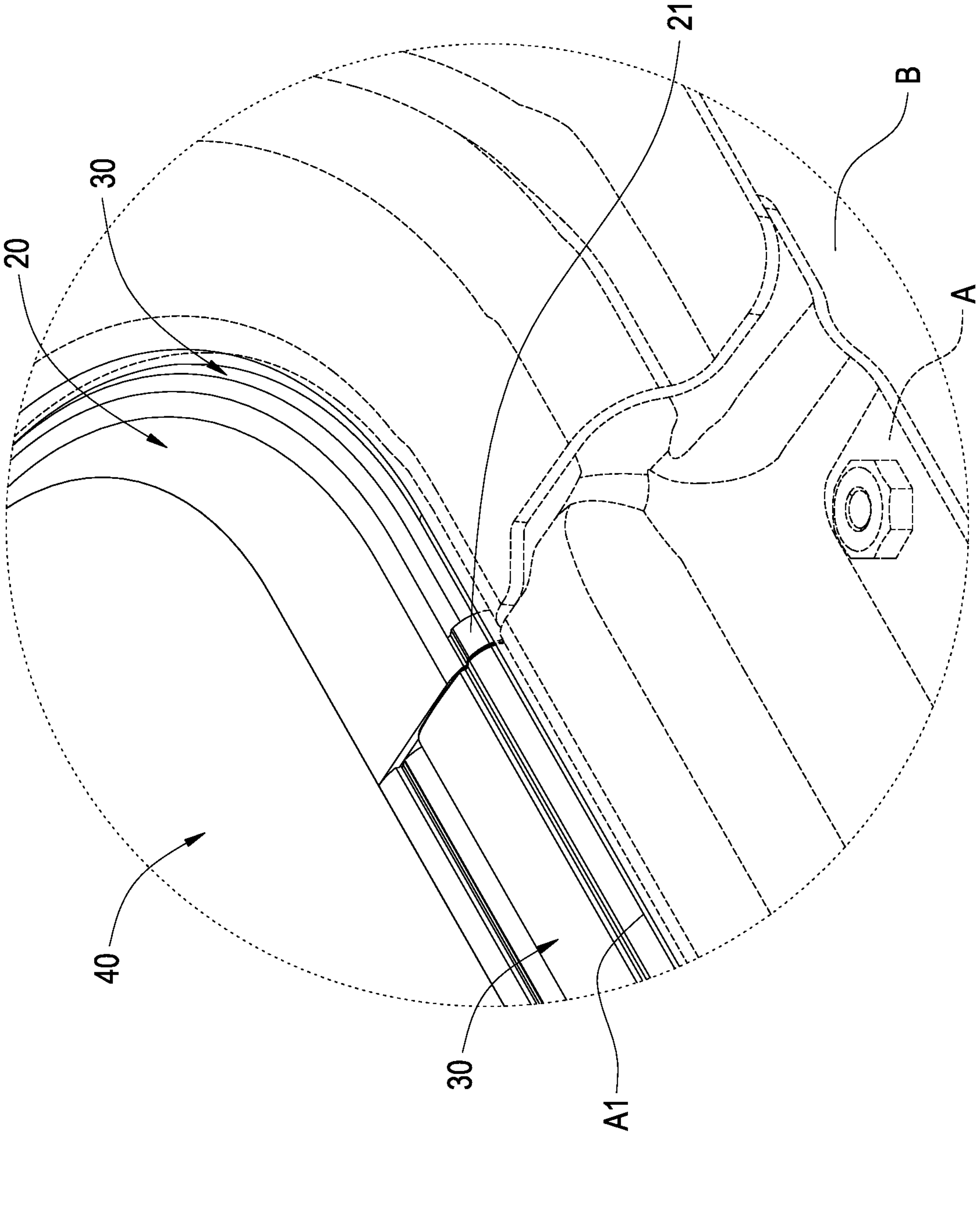
FIG. 9 is a partially enlarged view according to the second exemplary embodiment of the present disclosure.

As shown in FIG. 1 to FIG. 5, the present disclosure provides an automotive sunroof apparatus and a window panel assembly thereof. The automotive sunroof apparatus includes a car body and a window panel assembly. In addition, the car body includes a window opening A1 provided for the installation of the window panel assembly. It shall be noted that the car body in an exemplary embodiment includes reinforced bracket A and steel plate B. The steel plate B covers the top and side edges of the reinforced bracket A to increase the structural strength via the reinforced bracket A. In addition, the window opening A1 is defined on the reinforced bracket A and the steel plate B to allow the window panel assembly of the present disclosure to be installed thereon. However, the present disclosure is not limited to such configuration only; for example, the car roof may be made of the steel plate B only. As shown in FIG. 4, the window panel assembly may be a moving sunroof which is capable of closing at least a portion of the window opening A1. Alternatively, as shown in FIG. 4, FIG. 5 and FIG. 9, the window panel assembly may also be a fixed window 40 which is permanently closing at least a portion of the window opening A1. Please refer to FIG. 1 to FIG. 3. First, a moving sunroof is used as an example for illustration. In this exemplary embodiment, the window panel assembly includes a glass panel 10, a window frame 20 and a sealing strip 30.

In this exemplary embodiment, the glass panel 10 is substantially of a rectangular shape, and four corners of the glass panel 10 have fillets respectively to prevent fracture due to stress concentration. However, the present disclosure is not limited to such shape only, and the designer is able to adjust the outer shape of the glass panel 10 depending upon different needs.

The window frame 20 matches with the outer shape of the glass panel 10 correspondingly and is arranged at the outer perimeter of the glass panel 10. The glass panel 10 may be secured inside the window frame 20 via the method of adhesion, press fitting or latching, etc. The present disclosure is not limited to any method as long as the glass panel 10 is secured inside the window frame 20. A portion of the outer perimeter of the window frame 20 includes at least an abutment seat 21 extended outward therefrom. In this exemplary embodiment, the abutment seat 21 is arranged perpendicular to the semi-circle plate of the window frame 20 and includes a connecting portion 211 and an elastic arm portion 212. Two ends of the connecting portion 211 are connected to the window frame 20 and the elastic arm portion 212 respectively. The elastic arm portion 212 includes an abutment surface 212A abutting against an inner edge of the window opening A1. The abutment seat 21 includes a pair of blocking surfaces 212B arranged at two sides of the abutment surface 212A. To be more specific, a buffer space 213 is defined between the elastic arm portion 212 and the window frame 20, and the abutment surface 212A is arranged at one side of the elastic arm portion 212 opposite from the buffer space 213. Accordingly, when the abutment surface 212A of the elastic arm portion 212 is compressed, the elastic arm portion 212 is able to generate elastic deformation to retract toward the buffer space 213. In this exemplary embodiment, the window frame 20 and the abutment seat 21 are integrally formed (or formed in one piece) by injection molding with polyurethane (PU). The present disclosure is not limited to such material only. The window frame 20 and the abutment seat 21 may also be integrally formed (or formed in one piece) by plastic injection molding with other materials.

In this exemplary embodiment, the sealing strip 30 is made of a rubber material. The present disclosure is not limited to such material only. In another embodiment, the sealing strip 30 and the elastic arm portion 212 may be made of different materials. The sealing strip 30 is arranged at the outer perimeter of the window frame 20 to achieve sealing between the sealing strip 30 and the window frame 20. In addition, the sealing strip 30 may be secured to the outer perimeter of the window frame 20 via the method of latching, locking or adhesion; however, the present disclosure is not limited to the aforementioned securement method only. One end of the sealing strip 30 abuts against one of the blocking surfaces 212B of the abutment seat 21 to achieve sealing between the sealing strip 30 and the abutment seat 21. In this exemplary embodiment, the window frame 20 includes two abutment seats 21 extended therefrom, and the sealing strip 30 has a U-shape structure allowing its two ends to abut against the one of the blocking surfaces 212B of each abutment seat 21 respectively. The present disclosure is not limited to such configuration only. For example, the quantity of the abutment seat 21 may be one such that the two ends of the sealing strip 30 abut against the blocking surfaces 212B at two sides of the abutment seat 21 respectively.

As shown in FIG. 4 to FIG. 8, when the moving sunroof of the window panel assembly of this exemplary embodiment, installed on the window opening A1 of the car body steel plate B, changes from an open state to a close state, the lateral side of the sealing strip 30 and the abutment surface 212A of the elastic arm portion 212 are able to press the inner edge of the window opening A1 of the steel plate B firmly to achieve sealing between the window panel assembly and the car body steel plate B. To be more specific, the dimension of the outer edge of the window panel assembly is slightly greater than the dimension of the inner edge of the window opening A1 on the steel plate B. Accordingly, when the window panel assembly is installed inside the window opening A1 of the car body steel plate B, the outer edge of the sealing strip 30 and the abutment surface 212A of the abutment seat 21 are able to abut against the inner edge of the window opening A1 of the steel plate B firmly, thereby causing the sealing strip 30 and the elastic arm portion 212 of the abutment seat 21 to generate elastic deformation to achieve sealing. Furthermore, the elastic arm portion 212 generates deformation toward the window frame 20 to retract toward the buffer space 21, and the elastic arm portion 212 may generate a certain degree of interference with the steel plate of the car window, thereby achieving the sealing effect while preventing excessive interference with the car body steel plate B that may cause structural damage.

To be more specific, as shown in FIG. 5, the moving sunroof of the window panel assembly in this exemplary embodiment is under the open state. At this time, both the sealing strip 30 and the abutment seat 21 are not in contact with the car body steel plate B. In addition, approximately half of the area of the window opening A1 of the car body steel plate B is installed with a fixed window 40. The fixed window 40 is arranged opposite from the moving sunroof of the window panel assembly, and a sealing strip 30 is also installed between the fixed window 40 and the window opening A1 of the steel plate B to achieve sealing.

Next, please refer to FIG. 4 and FIG. 6 to FIG. 8. The moving sunroof of the window panel assembly in this exemplary embodiment is under the close state. At this time, the lateral side of the sealing strip 30 and the abutment seat 212A of the abutment seat 21 abut against the inner edge of the window opening A1 of the steel plate B firmly, and one end of the sealing strip 30 of the fixed window 40 abuts against another blocking surface 212B of the abutment seat 21. To be more specific, one end of the sealing strip 30 of the window panel assembly and one end of the sealing strip 30 of the fixed window 40 abut against the blocking surfaces 212B at two sides of the abutment seat 21 respectively to achieve sealing. Accordingly, as the sealing strips 30 (made of rubber material in this exemplary embodiment) of a relatively lower hardness respectively abut against the abutment seat 21 (made of PU material in this exemplary embodiment) of a relatively higher hardness, each one of the sealing strips 30 is able to effectively generate deformation to achieve sealing with the abutment seat 21. Consequently, it is able to overcome the drawback of improper sealing due to gaps formed by the sealing strips 30 under direct abutment between materials of similar hardness. It shall be noted that the above exemplary embodiment illustrates the attachment area between the moving sunroof and the fixed window 40 only. A designer may make corresponding adjustments for other unillustrated parts (attachment areas of other sealing strips 30 of the moving sunroof and fixed window) based on the configuration disclosed.

It shall also be noted that the window panel assembly of the present disclosure is not limited to the type of moving sunroof. Please refer to FIG. 4, FIG. 5, and FIG. 9. According to a second exemplary embodiment of the present disclosure, the window panel assembly is a fixed window 40, and the quantity of the sealing strip 30 refers to a plurality of sealing strips 30. Accordingly, the outer shape of each sealing strip 30 may be simplified to facilitate the manufacturing process. To be more specific, the abutment seat 21 is arranged adjacent to the corner of the window frame 20, such that each one of the sealing strips 30 at two sides are able to abut against the two blocking surfaces 212B of the abutment seat 21. Accordingly, each one of the sealing strips 30 may be designed to have a simple linear structure or a linear structure with slightly bent rear ends. In comparison to the U-shape structure, the sealing strips 30 of a linear structure may be manufactured more easily and the assembly process is also facilitated.

Moreover, according to another exemplary embodiment (not shown in the drawings) of the present disclosure, the entire outer perimeter of the window frame 20 includes the abutment seat 21 extended therefrom to replace the sealing strip 30 completely. Consequently, during the installation of the window panel assembly on the car body steel plate B, the sealing is achieved entirely by the abutment surface 212A of the elastic arm portion 212 of the abutment seat 21 abutting against the inner edge of the window opening A1 of the car body steel plate B. With such configuration, the problems associated with the color change of outer appearance or unpleasant odor of the sealing strip 30 due to deterioration after long period of use may be prevented, and the number of components of the window panel assembly is also reduced, such that the overall assembly process is simplified and manufacturing process is facilitated.

Figure 10:
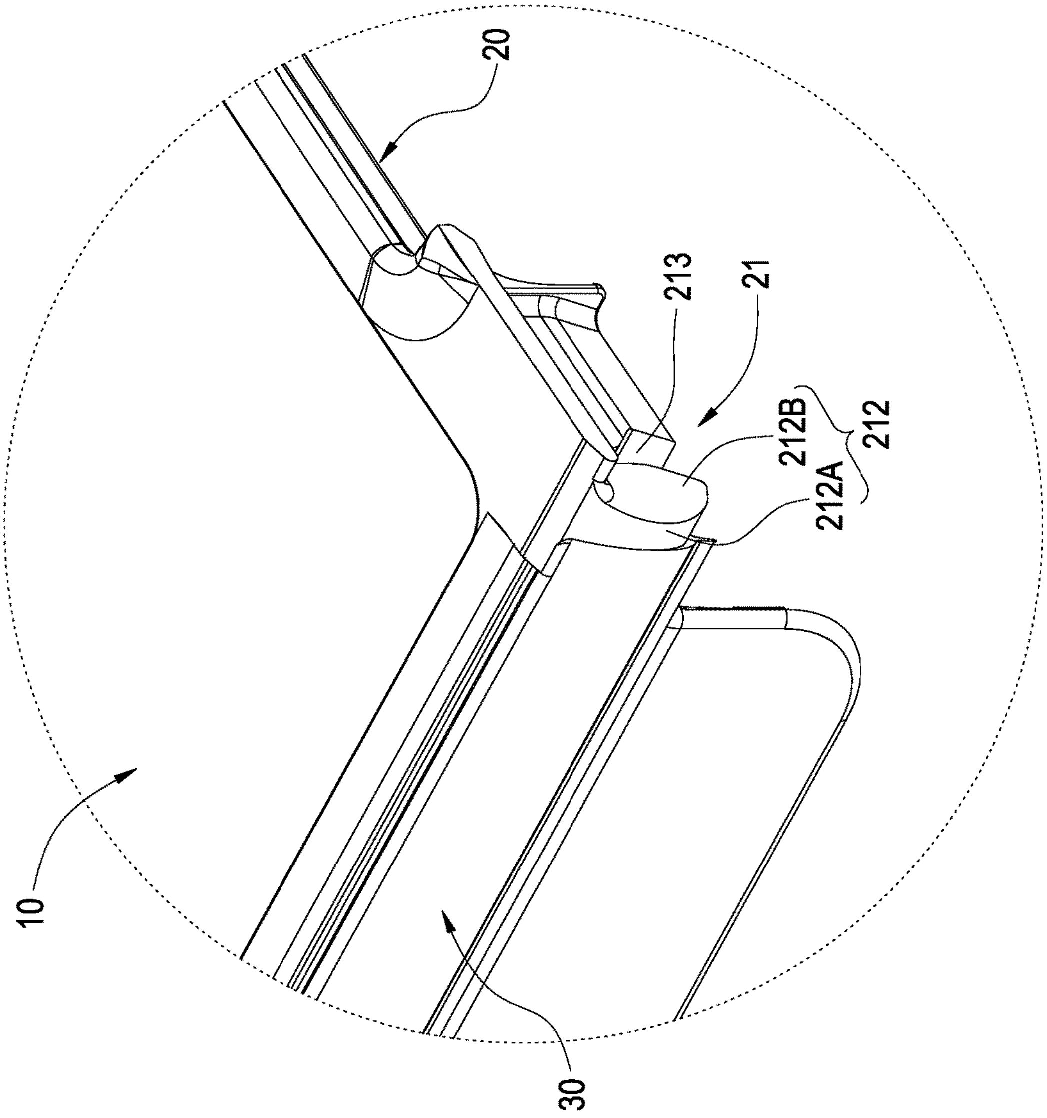
FIG. 10 is a partial perspective appearance view of the third exemplary embodiment of the present disclosure.
Figure 11:
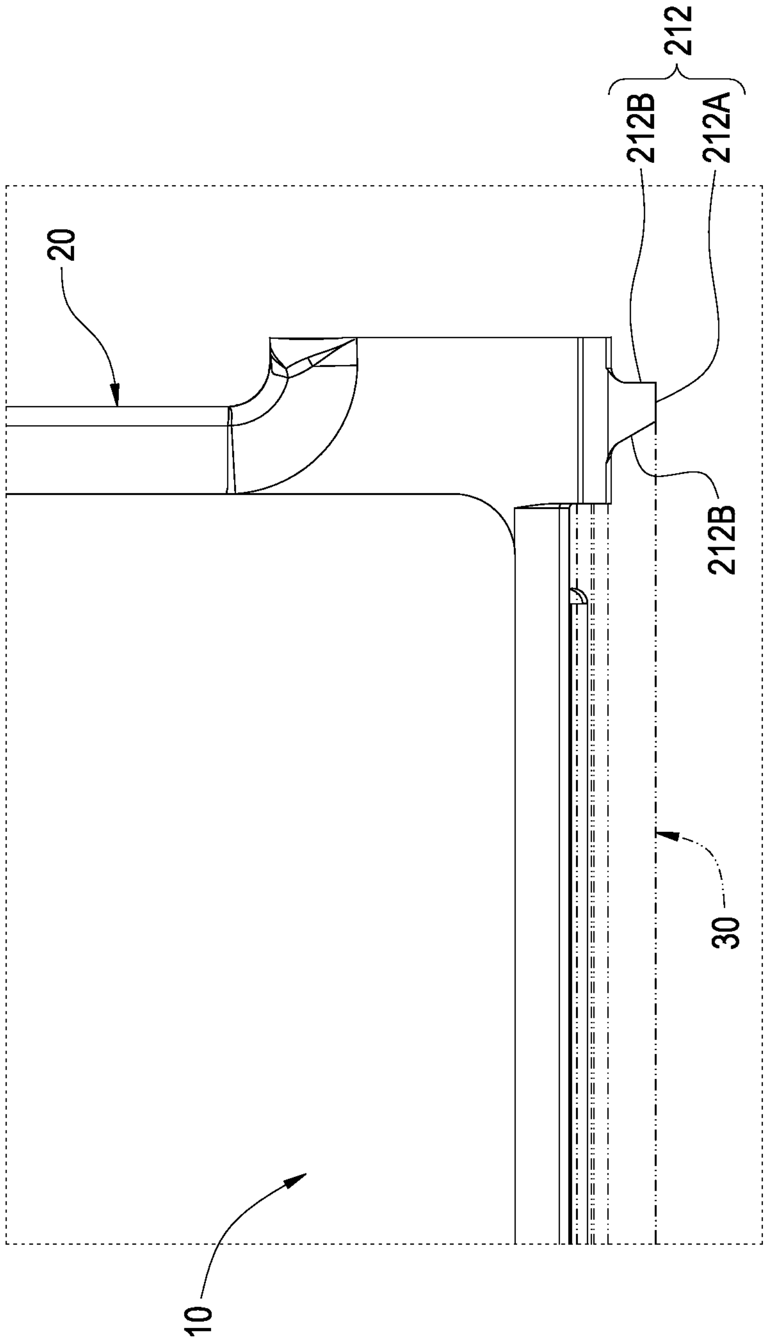
FIG. 11 is a partial top view of the third exemplary embodiment of the present disclosure.

In addition, please refer to FIG. 10 and FIG. 11, showing a third exemplary embodiment of the present disclosure. The difference between the third exemplary embodiment and the first exemplary embodiment mainly relies in the thickness of the abutment seat 21. To be more specific, different from the semi-circular plate of the abutment seat 21 of the first exemplary embodiment, although the cross-sectional shape of the abutment seat 21 in this exemplary embodiment is also of a semi-circular shape, the thickness of the abutment seat 21 in this exemplary embodiment is tapered from the connecting portion 211 toward the abutment surface 212A of the elastic arm portion 212. Which means, a cross-sectional area of the elastic arm portion (212) is wider than an area of the abutment surface (212A). Accordingly, it shows a trapezoid shape in the partial top view shown in FIG. 11, and the two blocking surfaces 212B between the window frame (20) and the abutment surface 212A may also have a flat or curved surface. The present disclosure is not limited to the type of the surface, and any type of the surface is acceptable depending upon the manufacturing needs and as long as the thickness of the abutment seat 21 is tapered from the connecting portion 211 toward the abutment surface 212A. Consequently, since the thickness of the abutment seat 21 is relatively thinner at the portion contacting the vehicle body, and the portion connecting to the window frame 20 at the window side is relatively thicker, the structural strength of the abutment seat 21 may be increased significantly. As a result, when the window panel assembly (i.e., a moving sunroof) contacts the metal sheet B of the vehicle body with friction during the lifting or restoration process, deformation of the abutment seat 21 may be prevented, thereby effectively ensuring the stability and durability of the abutment seat 21 after a long period of use.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A window panel assembly, comprising:

a glass panel;

a window frame, installed on an outer perimeter of the glass panel, comprising a main body surrounding the glass panel and an abutment seat extended outward from the main body, the abutment seat comprising a connecting portion and an elastic arm portion, the connecting portion connected between the main body and a top of the elastic arm portion, the connecting portion, the elastic arm portion and the main body together form a buffer space thereamong, the elastic arm portion comprising an abutment surface, the abutment seat comprising a pair of blocking surfaces arranged at opposite sides of the elastic arm portion and adjacent to the abutment surface; and a sealing strip, arranged around the main body, and one end of the sealing strip abutting against one of the blocking surfaces;

wherein when the abutment surface is compressed, the elastic arm portion is configured to generate an elastic deformation to retract toward the buffer space.

2. The window panel assembly according to claim 1, wherein the elastic arm portion is a semi-circle plate.

3. The window panel assembly according to claim 1, wherein the abutment surface is arranged on one side of the elastic arm portion opposite from the buffer space.

4. The window panel assembly according to claim 1, wherein the abutment seat is two in number, two ends of the sealing strip abut against the blocking surfaces of the abutment seats respectively.

5. The window panel assembly according to claim 1, wherein the sealing strip is two in number, one end of each the sealing strip abuts against each the blocking surface of the abutment seat.

6. The window panel assembly according to claim 1, wherein the window frame and the abutment seat are integrally formed by plastic injection molding.

7. The window panel assembly according to claim 1, wherein the window frame and the abutment seat are integrally formed by injection molding with a polyurethane material.

8. The window panel assembly according to claim 1, wherein a thickness of the abutment seat is tapered from the connecting portion toward the abutment surface.

9. The window panel assembly according to claim 1, wherein a cross-sectional area of the elastic arm portion is wider than an area of the abutment surface.

10. An automotive sunroof apparatus, comprising:

a car body, comprising a window opening; and a window panel assembly, arranged on the window opening, comprising a glass panel, a window frame and a sealing strip, the window frame installed on an outer perimeter of the glass panel, the window frame comprising a main body surrounding the glass panel and an abutment seat extended outward from the main body, the abutment seat comprising a connecting portion and an elastic arm portion, the connecting portion connected between the main body and a top of the elastic arm portion, the connecting portion, the elastic arm portion and the main body together form a buffer space thereamong, the elastic arm portion comprising an abutment surface, the abutment seat comprising a pair of blocking surfaces arranged at opposite sides of the elastic arm portion and adjacent to the abutment surface, the sealing strip arranged around the main body, one end of the sealing strip abutting against one of the blocking surfaces, wherein when the window panel assembly closes the window opening, a lateral side of the sealing strip and the abutment surface press an inner edge of the window opening;

wherein when the abutment surface is compressed, the elastic arm portion is configured to generate an elastic deformation to retract toward the buffer space.

11. The automotive sunroof apparatus according to claim 10, wherein the elastic arm portion is a semi-circle plate.

12. The automotive sunroof apparatus according to claim 11, wherein the abutment surface is arranged on one side of the elastic arm portion opposite from the buffer space.

13. The automotive sunroof apparatus according to claim 10, wherein the abutment seat is two in number, two ends of the sealing strip abut against the blocking surfaces of the abutment seats respectively.

14. The automotive sunroof apparatus according to claim 10, wherein the sealing strip is two in number, one end of each sealing strip abuts against each blocking surface of the abutment seat.

15. The automotive sunroof apparatus according to claim 10, wherein the window frame and the abutment seat are integrally formed by plastic injection molding.

16. The automotive sunroof apparatus according to claim 10, wherein the window frame and the abutment seat are integrally formed by injection molding with a polyurethane material.

17. The automotive sunroof apparatus according to claim 10, wherein a thickness of the abutment seat is tapered from the connecting portion toward the abutment surface.

18. The automotive sunroof apparatus according to claim 10, wherein a cross-sectional area of the elastic arm portion is wider than an area of the abutment surface.

* * * * *